United States Patent Office 3,334,151
Patented Aug. 1, 1967

3,334,151
PROCESS FOR MANUFACTURING ORGANIC
CONTAINING FLUORINE
Susumu Okazaki, Nakoso-shi, Japan, assignor to Kureha
Kagaku Kogyo Kabushiki Kaisha, Tokyo, Japan, a corporation of Japan
No Drawing. Filed Nov. 9, 1965, Ser. No. 507,055
4 Claims. (Cl. 260—651)

This is a continuation-in-part of application Ser. No. 186,286, filed Jan. 31, 1962 and now abandoned.

The present invention relates to a process for manufacturing organic compounds containing fluorine and more particularly a process for manufacturing organic compounds containing fluorine by replacing chlorine with fluorine in radical groups of organic chlorine compounds which have two or more chlorine atoms per a central carbon atom.

According to the present invention, I provide a process for manufacturing organic compounds containing fluorine characterized in that organic compounds containing halogen, which have at least two chlorine atoms on the same carbon atom, are treated with sodium fluoride of size of less than $50\mu$ at a temperature of more than $100°$ C. to form organic compounds containing fluorine and the organic compounds containing fluorine are recovered from the reaction residue.

In the present invention the organic compounds containing halogen as the raw material may be aliphatic organic compounds containing halogen which have at least two chlorine atoms on the same carbon atom and aromatic organic compounds containing halogen which have side chains having at least two chlorine atoms on the same carbon atom.

In the present invention sodium bifluoride can be used in place of sodium fluoride.

According to the present invention, as a catalyst, anhydrous iron halides, especially anhydrous iron chloride, or anhydrous aluminium halide, can be used.

Processes for obtaining organic compounds containing fluorine until now are roughly divided into the direct use method of elementary fluorine and the indirect use method of elementary fluorine which contains two steps, the preparation of inorganic higher fluoride, e.g. $CoF_3$, $MnF_3$, $ClF_3$, and the fluorination of organic compounds using the higher fluoride prepared above. There is still another method in which chlorine in organic compounds containing chlorine is substituted with fluorine by means of hydrogen fluoride. The former two are powerful fluorination methods, but as the elementary fluorine and the higher inorganic fluorides which can be obtained from it have violent chemical reaction, the production and the handling are difficult, and as their formation requires essentially high energy, they become extremely expensive raw materials. Adding to these undesirable characteristics is the fact that the fluorinating power is so strong that it induces undesirable cleavage and decomposition of chemical bonds. Therefore, it is usual to use them only for the production of special perfluoro organic compounds. For the production of ordinary organic compounds containing fluorine, the following halogen exchange method by hydrogen fluoride is common. As it is well known, the hydrogen fluoride can be obtained by adding concentrated sulfuric acid to high quality fluospar and heating it. To use it as fluorinating reagent, it must not be only chemically pure, but also its moisture content must be extremely low to keep the activity of the catalyst jointly used with the fluoriding agent. Adding to this, because of its comparatively violent corrosiveness and toxicity, its handling and disposal remain reasonably difficult and disadvantageous.

Therefore, I continued my research for a long time, making it my object to develop an easy and economical process for obtaining organic compounds containing fluorine. As a first step towards developing a cheap fluorine source, I performed research in making fluorination possible with sodium fluoride, or its related bifluoride, by adopting the fact that it is comparatively easier to obtain sodium fluoride, and—if necessary, also sodium bifluoride, when 3% to 4% fluorine content in the phosphate rock is recovered, an exhaust gas fixed out, and the rock treated with caustic soda. The removal of moisture in the raw material, sodium fluoride, and sodium bifluoride is more easily compared with the removal of moisture from hydrogen fluoride, and besides, their toxicity is insignificant and corrosiveness much less to the equipment and others.

However, after (a) determining by computation the chemical equilibrium value of fluorination with sodium fluoride that its fluorination should have progressed farther than that with hydrogen fluoride, (b) from; the present fluorination reaction, I have found that although it depends greatly upon the fineness of sodium fluoride, the halogen change occurred sufficiently with a fineness of less than $50\mu$ to form NaCl. For example, the carbon tetrachloride is reacted with sodium fluoride having a fineness of about $10\mu$ in the mol. ratio of $CCl_4/NaF=\frac{1}{2}$, and the mixture is heated at the temperature of $250°$ C. for two hours in a stainless steel autoclave. The following compounds are obtained per 1 mol. of $CCl_4$:

| Unreacted | Mol. |
|---|---|
| $CCl_3F$ | 0.336 |
| $CCl_2F_2$ | 0.003 |
| $CClF_3$ | 0.011 |
| $CCl_4$ | 0.618 |

The organic yield is 96.8%; $CCl_4$ conversion is 35.0%, and NaF conversion is 18.8%. This result is fairly good compared with the experimental result which is obtained with other fluorides of alkali metals and alkaline earth metals under the similar condition. Namely, if I enumerate these results with $CCl_4$ conversion only, it is as follows:

| Fluorination reagent: | $CCl_4$ conversion, percent |
|---|---|
| LiF | 12.3 |
| KF | 8.2 |
| $MgF_2$ | 2.2 |
| $CaF_2$ | 15.9 |
| $SrF_2$ | 39.2 |
| $BaF_2$ | 26.5 |

Although fairly good fluorinating power can be recognized in $SrF_2$ and $BaF_2$, sodium fluoride can be generally and advantageously employed, because it is non-hygroscopic and stable, and has the NaCl type crystal structure which can be easily pulverized and also is cheap.

At least as good and even better fluorination power is also recognized in sodium bifluoride. Sodium bifluoride is dissociated into sodium fluoride and hydrogen fluoride at about a temperature of $280°$ C. under normal pressure, but also under autogeneous pressure of raw materials, organic chloro compounds and fluoro compounds, the reaction may be sufficiently carried out at a temperature of more than $200°$ C., preferably at a temperature of more than $220°$ C. Among the compounds which are fluorinated are compounds having a radical which has at least two chlorine atoms per same carbon atom, for example $$CCl_4, \ CHCl_3, \ CH_3-CCl_3, \ C_6H_5-CCl_3, \ CH_3-CHCl_2$$

and others having $$-CCl_3, \ -\overset{H}{\underset{}{C}}Cl_2$$

etc., have great reactivity with NaF and NaF·HF. Generally, compounds of the general formula

wherein $R_1$ may be Cl, alkyl or aromatic and $R_2$ may be Cl or H are suitable for this invention.

Then I performed research concerning the catalysts which should make the above fluorination results still better and found out that ferric and ferrous halides have catalytic power. These results are attained when the reaction is carried out by simply adding 0.0625 mol. of anhydrous ferric chloride to 1 mol. of carbon tetrachloride under the similar conditions as described above, as follows:

| Unreacted | Mol. |
|---|---|
| $CCl_3F$ | 0.220 |
| $CCl_2F_2$ | 0.514 |
| $CClF_3$ | 0.040 |
| $CCl_4$ | 0.166 |

The organic yield is 94.0%, $CCl_4$ conversion is 77.3%, and NaF conversion is 68.3%. The following results are obtained when the reaction is carried out for four hours under the similar conditions:

| Unreacted | Mol. |
|---|---|
| $CCl_3F$ | 0.082 |
| $CCl_2F_2$ | 0.798 |
| $CClF_3$ | 0.069 |
| $CCl_4$ | 0.0409 |

When the solid residue is analyzed by the X-ray diffraction, the peak of $FeF_3$ (ferric fluoride) is recognized and the solid residue, when chemically analyzed after washing by water and by methanol, has, for example, Na:Fe:F mol. ratio of 3.6:1:5.9. I found, separately, that the recovered residue is a complex salt (or a double salt) containing $3NaF \cdot FeF_3$ or $Na_3FeF_6$ and partly $Na_3FeF_5$, from the facts that Na:Fe:F ratio of solid content which is formed and precipitated by incorporating ferric chloride or ferrous chloride and sodium fluoride in the mol. ratio of 6:1 and 3:1, respectively, is 3.7:1:5.4, and that their X-ray diffraction patterns are perfectly coincided. This fact indicates further, that the unreacted sodium fluoride and ferric salt used as a catalyst can be easily recovered, when the ferric chloride is used as the catalyst and controlled so as to maintain the residue composition at the Na:Fe:F mol. ratio of 3:1:6 or at near to such numerical values. By actually doing thus I found that the sodium fluoride recovery of more than 95% and the catalyst recovery of more than 90% can be obtained.

As described above, it is considered that the catalysts which may be used in the reaction have a catalytic action, due to a change into fluoride or fluoro chloride. If these catalysts are fed in other forms, for example, in the forms of iron filing or aluminium oxide, they pick up chlorine and then fluoride is formed from this to perform catalytic action. By the X-ray diffraction analysis of the solid residue of iron filings actually used as the catalyst reacted for two hours at the temperature of 250° C., crystals of $FeCl_2 \cdot 2H_2O$ are recognized.

Generally, C—F bond distance is regularly and considerably shortened in the poly halide radical group as the substitution of F atom against the similar carbon atom progresses. Therefore, the radical group is gradually stabilized. After the introduction of one F atom, the progress of the following reactions can be conducted rapidly to the desired stage or stopped by means of controlling the temperature, pressure, duration, quantity and quality of catalyst, etc.

Antimony fluoride is suggested in Australian Patent No. 3,141/31 as a catalyst for producing carbon halides. The catalysts $FeCl_3$ and $AlCl_3$ of the present invention, however, are significantly more desirable than antimony fluoride, and no equivalency between the catalyst of the present invention and that of the Australian patent were known in the art or exist in fact.

$SbCl_5$, developed as of Swarz's reaction, has been most commonly used as a fluorination catalyst. Its catalytic function follows the equation:

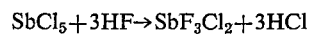

or

or, as further generalized,

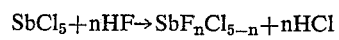

It will become antimony fluorochloride, which will become a fluorine carrier and a homogenizer between an organic halide to be fluorinated and a fluorine atom.

It is now recognized that even in a reaction of NaF and $SbCl_5$, in $CCl_4$, $SbF_2Cl_3$ will be first produced at a temperature below 100° C. and will then be converted to $NaSbF_6$ at a higher temperature, and further, that in reactions at a temperature above 100° C. in organic halides of NaF with $FeCl_3$ and $AlCl_3$, it will quickly become such complex salts as $NaFeF_4$, $Na_3FeF_6$, and $Na_3AlF_6$. Thus, for the above described reason, $SbCl_5$, $FeCl_3$, and $AlCl_3$ can hardly be considered to act as Lewis acid catalysts in the present fluorination, and accordingly are not equivalent.

Ferric chloride and aluminium chloride are disproportionation catalysts, and it is now known that these catalysts effect a "true" fluorination reaction. A "true" fluorination reaction is shown by the following reaction embodying any fluorination agent:

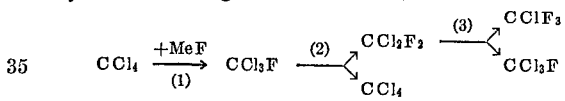

The above whole step is industrially defined to be the so-called "fluorination," but when it is considered as the elementary reaction, the reaction (1) is the true fluorination reaction based upon a direct halogen substitution. On the contrary, the reactions (2) and (3) are a disproportionation or rearrangement reaction.

As described above, $FeCl_3$ and $AlCl_3$ were known as catalysts for accelerating the reactions (2) and (3), but it has been unknown that they are used for directly accelerating the reaction (1) (see "Ind. Eng. Chem." 39 (1947), pages 404–409).

It has been found that a difference of at least 5%–10% results in the conversion of $CCl_4$, for example, depending upon the presence of the catalyst of the present invention as compared with the catalyst, such as the antimony halide, which promoted the disproportionation of

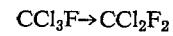

The mechanism behind this can be shown in the following graphic illustration using ferric chloride as a "true" fluorination catalyst which proceeds by the formation of an active outer orbital (or high spin) complex and dissociative exchange decomposition in the ligand exchange:

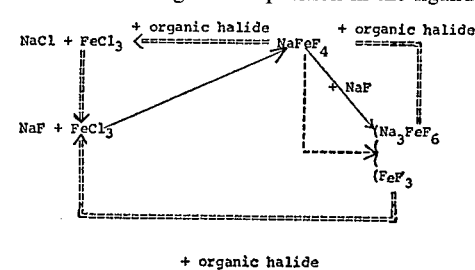

Na₃AlF₆ will form an outer orbital complex of $3S3P^33d^2$ from the electron configuration of Al, and Na₃FeF₆. It will also form an outer orbital complex of $4S4P^34d^2$, which is evident from the observation of the magnetic moment. SbCl₅ will also form outer orbital complexes of NaSbF₆ at the fluorination temperature; however, as the electronegativity of Sb increases, the ionicity of the bond between the central metal and ligand (fluorine) will decrease. Therefore, as a result, the catalytic activity of SbCl₅ will be definitely weaker than that of FeCl₃ and AlCl₃.

The present invention is illustrated by the reference to the following examples:

Example 1

116 grams of carbon tetrachloride were mixed with 63 grams of sodium fluoride. The mixture was charged into a stainless steel autoclave having a capacity of 1 liter which was thereafter closed. The mixture was heated up to about 250° C. for about 35 minutes by rotating the shaft of the autoclave which has two plates on the axis at the rotating velocity of about 500 r.p.m., and then was maintained at 250±3° C. for 85 minutes. After the completion of reaction, the product gas was withdrawn from the autoclave and the high boiling components of the product were caught by passing through two traps, one of which was cooled to 0° C. and other of which was cooled to −10° C., and the uncondensed gas was collected in a gas burrette. When the gas was analyzed by gas chromatography, there were obtained 34.6 grams of monofluorotrichloromethane, 0.31 gram of difluorodichloromethane, and 0.85 gram of trifluoromonochloromethans. Carbonaceous residue was not found. The conversion into organic fluoro compound of carbon tetrachloride was 35.0% and the conversion of sodium fluoride was 18.8%.

Example 2

77 grams of carbon tetrachloride, 42 grams of sodium fluoride, and 2.53 grams of anhydrous ferric chloride were together mixed. The mixture was charged into a stainless steel autoclave which was thereafter closed. The mixture was heated up to 250° C. for about 55 minutes by rotating the shaft of the autoclave at the rotating velocity of 300–500 r.p.m. and then was maintained at 250±5° C. for 190 minutes. A product was withdrawn from the autoclave and the high boiling components of the product were caught by passing through two traps, one of which was cooled to 0° C. and the other of which was cooled to −10° C., and uncondensed gas was collected in a gas reservoir. When the gas was analyzed by gas chromatography, there were obtained 66 grams of monofluorotrichloromethane, 47.9 grams of difluorodichloromethane, and 1.4 grams of trifluoromonochloro methane. In this case the conversion into organic fluoro compound of carbon tetrachloride was 91.5% and that of sodium fluoride was 88.1%.

Example 3

77 grams of carbon tetrachloride, 31 grams of sodium bifluoride passing through 325 mesh sieve and 3.5 grams of anhydrous ferric chloride were mixed together. The mixture was charged into the same autoclave as described in Example 1, which was thereafter closed. The mixture was heated up to 250° C., during about 53 minutes by rotating the shaft of the autoclave at the rotating velocity of 400–500 r.p.m. and then maintained at 250±3° C. for 3 hours. Then a product was obtained by the same operation as described in Example 1. The product was analyzed, and there was obtained 5.9 grams of monofluorotrichloromethane, 50 grams of difluorodichloromethane and 1.2 grams of trifluoromonochloromethane. The conversion based upon carbon tetrachloride was 93.5% and that based upon sodium bifluoride was 90.3%.

Example 4

119.5 grams of hexachloroethane, 84 grams of sodium fluoride passing through 325 mesh sieve and having average size of about 10μ and 8.35 grams of anhydrous aluminium chloride were mixed. The mixture was charged into same autoclave as described in Example 1, which has a capacity of 500 cc. and was heat-treated at a temperature of 280–300° C. for six hours by rotating and agitating the autoclave at the rotating velocity of 500–600 r.p.m., as described in Example 1. In this case, the maximum pressure was reached to 36 kg./cm.² The product was withdrawn from the autoclave, and the high boiling components of the product were separated from the low boiling components of the product and the components were analyzed. There were obtained 4.5 grams of monofluoropentachloroethane, 15.8 grams of difluorotetrachloroethane, 30.4 grams of trifluorotrichloroethane, 12.1 grams of tetrafluorodichloroethane, and 13.1 grams of tetrachloroethylene. The conversion into organic fluoro compounds of hexachloroethane was 66.1% and the conversion into organic chloro compounds of the fluorine content in sodium fluoride was 47.2%.

Example 5

The composition of 100 grams of residue of fluorination reaction as described in Example 2 was analyzed. As to the results, sodium content was about 36.7%, fluorine content about 3.8%, iron content about 1.8%, and the rest was chlorine content. By the X-ray diffraction analysis of the residue, it was found that sodium fluoride was 0.12 mol. per 100 grams of the sample, ferric fluoride was 0.029 mol. and ferric chloride was 0.020 mol. Thus, from these analytical data, it was found that the mol. number of sodium fluoride which is sufficient to form the 3NaF·FeF₃ from each FeF₃ and FeCl₃ was 0.087 mol. and 0.120 mol., respectively, and thus the total mol. number was 0.207 mol. Then when 100 grams of sample was treated with 100 cc. of water containing 0.08 mol of NaF, FeF₃, FeCl₃, etc., which were dissolved in aqueous NaF solution, a new precipitate is formed, which when dried produced 17 grams of solid matter. The form of this solid matter was recognized to coincide with 3NaF·FeF₃ by the chemical analysis and also by the X-ray diffraction pattern. The percentage of recovery of F and Fe content in the solid matter having this form was 98.5% and 96%, respectively. It was recognized that this fact from the fluorination of CCl₄ could be carried out on conversion rate of more than 95% without the addition of new catalyst.

I claim:

1. A process for manufacturing organic fluorine compound comprising reacting an organic chlorine compound selected from the group consisting of compounds having the general formula,

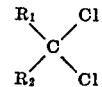

wherein R₁ is selected from the group consisting of —CH₃, Cl and -phenyl and wherein R₂ is selected from the group consisting of Cl and H, with sodium fluoride of particle size less than 50 microns at a temperature of 100° to 300° C. in the presence of a catalyst selected from the group consisting of anhydrous aluminium chloride and ferric chloride.

2. The process as claimed in claim 1, wherein at least a part of the sodium fluoride and ferric chloride are replaced with 3NaF·FeF₃.

3. The process of claim 1, wherein the sodium fluoride is sodium bifluoride.

4. The process as claimed in claim 2, wherein a 3NaF·FeF₃ is recovered from previous fluorination process as a residue.

(References on following page)

References Cited

UNITED STATES PATENTS

| | | | |
|---|---|---|---|
| 2,004,931 | 6/1935 | Daudt et al. | 260—653.8 X |
| 2,013,062 | 9/1935 | Midgely et al. | 260—653.8 |
| 2,884,453 | 4/1959 | Tullock | 260—653 |
| 2,924,624 | 2/1960 | Forshey | 260—653 |
| 2,935,531 | 5/1960 | Dahmlos | 260—653.8 |
| 3,131,226 | 4/1964 | Olstowski et al. | 260—653.8 |
| 3,146,275 | 8/1964 | Dahmlos | 260—653.8 |

FOREIGN PATENTS

| | | |
|---|---|---|
| 3,141/31 | 7/1931 | Australia. |

OTHER REFERENCES

Fukui et al.: Chem. Abs. 52, 13773(b), (1958).
Hudlicky: Chemistry of Organic Fluorine Compounds, p. 104 (1962), The Macmillan Co., New York.
Mueller et al.: Chem. Abs. 57, 370(d), (1962).
Nakajima: Chem. Abs. 60, 5335(b), (1964).

LEON ZITVER, *Primary Examiner.*

N. J. KING, H. T. MARS, *Assistant Examiners.*